Patented Feb. 15, 1944

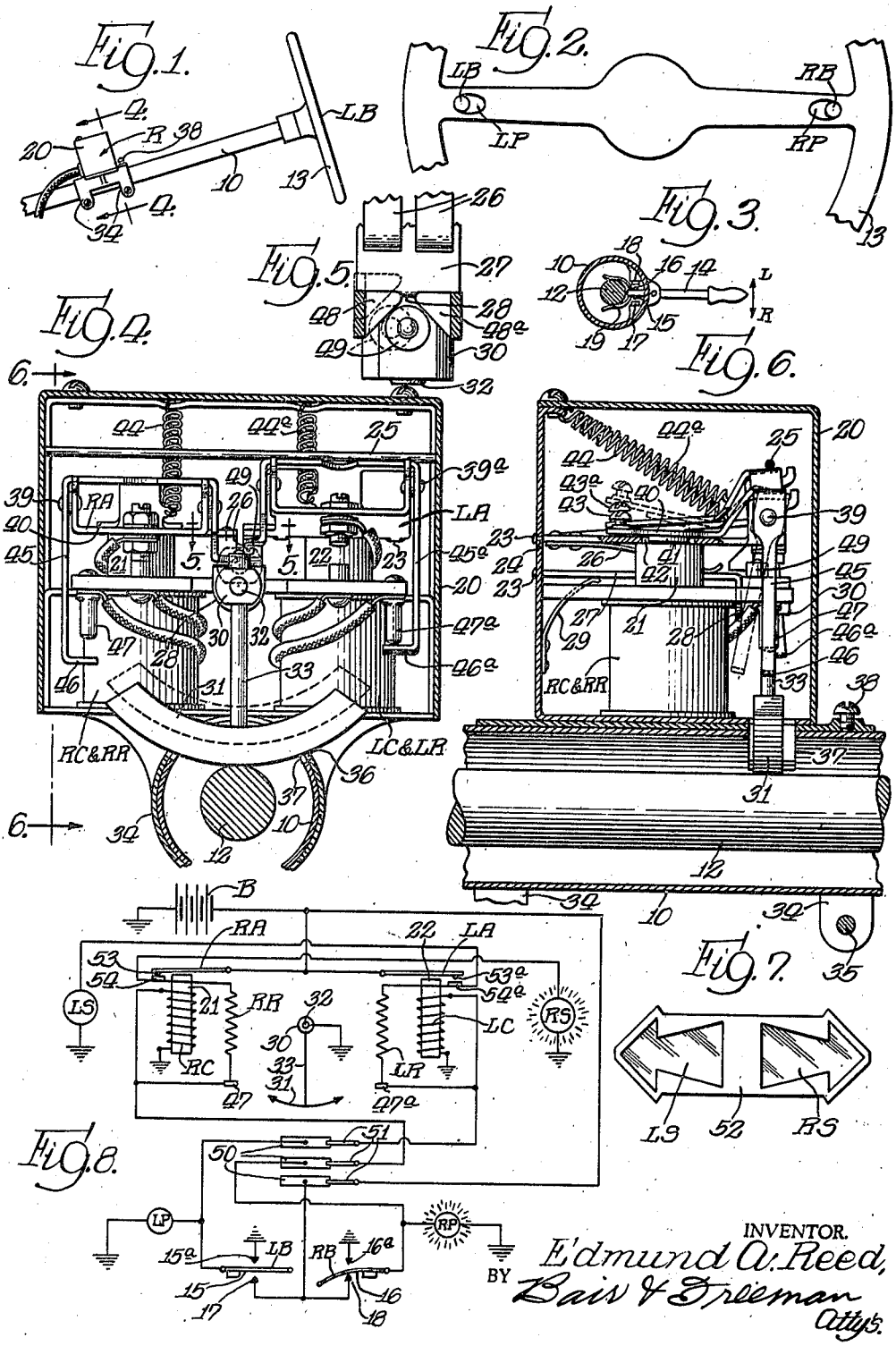

2,342,010

UNITED STATES PATENT OFFICE 2,342,010

VEHICLE SIGNAL

Edmund A. Reed, Des Moines, Iowa

Application February 24, 1941, Serial No. 380,287

10 Claims. (Cl. 177—339)

My present invention relates to an automatic vehicle signal having improved operating characteristics over the signal shown in my Patent No. 2,092,333, issued September 7, 1937.

A main object of the present invention is to provide a signal device for automobiles and the like which makes it possible to energize a signal light for an intended turn to the right or left and the mechanism will automatically turn off the signal light after the turn is completed, regardless of whether a turn in the opposite direction from that intended is made in the meantime.

Another object is to provide a vehicle signal including means for automatically deenergizing a signal that has been energized manually, with such deenergization occurring as a result of a shunting contact arrangement so designed and related to the circuit of the signal and to the mechanism thereof that all arcing is eliminated as the shunting circuit is established and deterioration of the contacts is thereby eliminated and their life rendered practically indefinite.

Still another object is to provide a vehicle signal, such as a turn signal for an automobile, truck or truck trailer combination which can be manually set before the turn is made and which is automatically deenergized after the turn is completed and the vehicle commences to again assume a straight course. In this connection, most present day signals must either be held in "on" position by one hand of the operator while turning the corner, or released before he turns the corner if he wishes to use both hands in steering his automobile around the corner.

A further object is to provide a signal which may be manually operated for indicating a desired turn and in which the initial condition may be restored manually by reverse movement of the manual control means.

Still a further object is to provide a vehicle signal including control buttons preferably mounted in the spokes of the steering wheel and a relay arrangement including a shoe operated by the relay to frictionally engage the steering shaft or other movable part of the steering mechanism of the automobile, and adapted to engage a stop when the automobile turns either in the intended direction or a reverse direction, whereafter slippage occurs as additional movement is imparted to the steering mechanism, the relay being designed to then effect movement of the shoe when the steering mechanism moves in a reverse direction from the intended direction to straighten up the vehicle, the shoe thereupon starting to move in a reverse direction and soon engaging a contact when moving in such direction to deenergize the relay and the signal lights.

Still a further object is to provide deenergizing means for the relay in the form of a contact with which the shoe engages so as to establish a shunt circuit for the relay coil, such circuit passing through a resistance so as to prevent a short circuit of the current supply and effecting deenergization of the relay without any arcing whatsoever between the shoe and the contact.

With the foregoing and other contemplated as well as obvious objects in view, the invention comprises the combination of elements and arrangements of parts so combined as to coact and cooperate with each other in the performance of the functions and the accomplishment of the results herein contemplated, and comprises in one of its adaptations the species or preferred form illustrated in the accompanying drawing, wherein Figure 1 is a side elevation of a steering column and steering wheel of an automobile showing my automatic vehicle signal applied thereto;

Figure 2 is an enlarged plan view of a portion of the steering wheel showing the control buttons and pilot lights mounted therein;

Figure 3 is a sectional view through a steering column showing a modified form of control device;

Figure 4 is an enlarged sectional view on the line 4—4 of Figure 1 showing the relay mechanism of my signal;

Figure 5 is an enlarged sectional view on the line 5—5 of Figure 4 showing a cam operated tripping mechanism;

Figure 6 is a sectional view on the line 6—6 of Figure 4;

Figure 7 is a front elevation of a signal casing which may be placed at the front and/or rear of the automobile, and Figure 8 is an electrodiagrammatic view of the complete signal system.

On the accompanying drawing I have used the reference numeral 10 to indicate a steering column of an automobile and 12 the steering shaft therein. A steering wheel 13 is mounted on the shaft 12 in the usual manner. I prefer to provide a steering wheel of special construction having control buttons LB and RB mounted in the spokes thereof, with pilot lights LP and RP also mounted therein. Instead of mounting the buttons LB and RB in the spokes of the steering wheel, a control lever 14 may be substituted therefor, such as shown in Figure 3, and having contacts 15 and 16 adaptable to engage contacts 17 and 18, respectively. When the lever 14 is swung upwardly, the contacts 15 and 17 are engaged to signal a left turn, while downward movement of the lever 14 engages contact 16 with contact 18 to signal a right turn, as will hereinafter apear in connection with the description of Figure 8. The lever 14 is normally held in a central position by a spring 19.

My vehicle signal includes a relay device indicated generally at R, consisting of a casing 20 in which are mounted a pair of relay coils RC and LC and a pair of resistance devices RR and LR, shown diagrammatically in Figure 8. The elements RC and RR are wound on a common core 21, and likewise the elements LC and LR are wound on a common core 22. The diagrammatic Figure 8, however, shows them separated for clarity.

For attraction by the core 21, I provide an armature RA, and for the core 22 an armature LA. The armatures RA and LA are pivoted to the casing 20 as by a pair of fingers 23 extending through slots 24 thereof and riveted so as to permit slight pivotal movement. The armatures are normally held in raised position against a stop rod 25 by leaf springs 26. The leaf springs 26 rest on a shoe carrying plate 27 having a downturned end 28, the plate being pivoted to the casing 20 in a manner similar to the armatures RA and LA. The plate 27 is normally held in raised position by a leaf spring 29, in which position a hub 30 and a shoe 31 would appear as indicated by dotted lines in Figure 4.

The hub 30 is pivoted on a pin 32 carried by the downturned end 28 of the plate 27 and supports the shoe 31 through a spoke 33. The casing 20 is secured on the steering column 10 by two pairs of clamp arms 34 and clamp bolts 35. The members 34 form a partial casing over the top of the steering column and are transversely slotted as indicated at 36 in Figure 4 to match a transverse slot 37 cut in the steering column to permit entry of the shoe 31 to a position where it may contact with the steering shaft 12 as shown in the solid line position. A set screw 38 is provided for preventing longitudinal movement of the casing 20 with respect to the steering column.

The armature RA will now be described, and such description will suffice also for the armature LA which is of similar construction. The armature RA has pivoted at 39 thereto a secondary armature 40. The armature 40 has a pole piece 41 located in an enlarged opening 42 in the main armature RA. A set screw 43 is provided for determining the distance of the pole piece 41 relative to the core 21 when the relay coil RC is energized as in Figure 6. A spring 44 is connected between the housing 20 and the secondary armature 40 and its tension is such that when the main armature is raised the tension will be practically zero, for a purpose which will hereinafter appear.

The secondary armature 40 has a guard arm 45 extending downwardly from one of the pivots 39 and terminating in a guard finger 46 for a contact 47.

The secondary armature 40 has a downwardly extending part terminating in a triangular shaped cam 48. The armature LA bears similar reference numerals with the addition of the letter a (elements 39ª to 48ª, respectively). The cams 48 and 48ª are adapted to coact with a roller 49 carried by the hub 30.

Referring to Figure 8, a wiring diagram is shown wherein a source of current supply is indicated by a battery B, such as the battery of the automobile. A left signal light LS and a right signal light RS are shown. To avoid twisting of wires, a commutator of usual construction may be employed, as indicated by collector rings 50 and brushes 51 applied to the steering shaft 12 in a well known manner. In the symbols employed on my drawing, R indicates right and L indicates left, such as LB indicating a left turn control button and RB a right turn control button. In Figure 7, a signal casing is shown at 52 in which the left and right signal lights LS and RS may be mounted.

*Practical operation*

In the operation of my vehicle signal, assuming that a right turn is to be made the right button RB is depressed, as shown in Figure 8, whereupon a circuit is established from the battery B through the lower collector ring 50 and the contacts 16 and 18 which divides in three directions. Part of the current goes through the right pilot RP to ground, part through the center collector ring 50 and the right coil RC to ground, and part through the center collector ring 50, the right resistance RR and the right signal RS to ground. Thus the right pilot light and the right signal are energized and energization of the right relay coil RC attracts the right armature RA.

Current is now supplied directly to the right signal RS from the battery through the right armature RA and is also supplied through the armature RA to the resistance RR and the relay coil RC in series with each other. It is now no longer necessary to keep the button RB depressed as a holding circuit has been established by closure of the contact 53 of the right armature RA against a cooperating contact 54. The button RB may accordingly be released with assurance that the lights RS and RP will remain energized. When the right coil RC is energized, its core 21 is magnetized so that in addition to the right armature RA being attracted the secondary armature 40 is also attracted, it being remembered that the spring 44 in the up positions of the armatures exerts very little pull on the secondary armature. Also, because of the proximity of the secondary armature to the main armature RA and the pole piece 41 being in the field of magnetic flux of the core 21, both will be attracted to the position shown in full lines for the near side armature in Figure 6.

Assuming now that a right turn is made by the automobile after proceeding in a straight line: Since the armature RA is down, its spring 26 will have forced the shoe 31 into contact with the steering shaft 12 so that a right turn thereof will cause the shoe to swing toward the right in Figure 4. The right end of the shoe will engage either the guard finger 46ª or the contact 47ª, but no circuit changes occur because 47ª is not energized. Any further rotation of the shaft 12 clockwise will result in the shaft slipping past the shoe.

During the swinging of the shoe 31 in a right hand direction, the roller 49 will swing in a left hand direction, as indicated by dotted lines in Figure 5, and engage the cam 48, thereby causing the secondary armature 40 to be positively swung to the dotted position of Figure 6. The roller 49 may now be disengaged from the cam 48, but the secondary armature will be retained raised by the spring 44 which is now under some tension, although less than when both armatures RA and 40 were down. The strength of the coil RC has been reduced by interposition of the resistance RR in series therewith so that it cannot again attract the secondary armature 40, and the armature will therefore remain in the dotted position of Figure 6 during reverse movement of the shoe 31.

As the driver now straightens his automobile after making a right turn, he rotates the shaft 12 in a counterclockwise direction, thus moving the shoe 31 toward the left. The left end of the shoe will soon engage the contact 47, thus establishing a shunt circuit across the coil RC so that current then flows through the line of least resistance from the contact 47, through 31, 33, 30 and 32 to ground, instead of through the coil RC to ground. The core 21 is accordingly sufficiently demagnetized to permit the main armature RA to be raised by what little tension there is in the spring 44 and its spring 26, thus breaking the circuit across the contacts 53 and 54 and restoring the system to its initial condition.

In making a right turn, a driver of an automobile usually swings slightly to the left before turning right in order to avoid hitting the curb. This is especially true of truck drivers who have long trucks or truck and trailer combinations. Accordingly, the first motion of the shoe 31 will be to the left instead of to the right, as already described. Consequently, the shoe 31 swings to the left and its left end of the shoe will engage the guard finger 46 instead of striking the contact 47 due to the relay coil RC being energized and the guard arm 45 and its guard finger 46 accordingly assuming the position shown in Figure 6. Thereafter, when the shaft 12 turns toward the right, the shoe will swing toward the right and go through the cycle of operations described in the last three paragraphs. It is therefore evident that the finger 46 has a very important function in preventing deenergization of the signal, if a turn is made in the opposite direction from that which is signaled for, and insures that the signal will be deenergized only when the signaled-for turn has been executed.

I have described the operation of the device for a right turn, and obviously its operation is similar for a left turn, whereupon the left button LB is depressed instead of the right one and the left coil LC, left resistance LR, left pilot LP and left signal LS are energized, instead of the right ones. My present arrangement, including the guard fingers 46 and 46ª, is a decided improvement over the arrangement shown in my prior patent, and the resistance devices RR and LR are important thereover from the standpoint of avoiding all short-circuits and preventing arcing of the contacts 31, 47 and 47ª. Thus all pitting of the contacts is eliminated and the signal device operates trouble free for a comparatively long life as compared with types of structures wherein circuits are broken by the engagement of contacts.

If it is desirable to manually release either signal LS or RS, the control button corresponding thereto can be pushed upwardly from below to make contact with ground contacts 15ª or 16ª, thus effecting a shunt circuit for the relay coils RC and LC in a manner similar to those effected by the shoe 31 automatically. During ordinary operation, however, the appropriate control button may be depressed and then released with assurance that the signal will be automatically turned off if and after the signaled-for turn is made. The relay construction is such that the contacts 47 and 47ª are effectively guarded by the fingers 46 and 46ª against any improper action resulting from a turn other than signaled for prior to the signaled-for turn being made.

While I have shown a particular embodiment of my invention, it will be understood of course that I do not wish to be limited thereto since many modifications may be made, and I therefore contemplate by the claims appended hereto to cover any such modifications or substitutions of mechanical equivalents as fall within the true spirit and scope of my invention without sacrificing any of its advantages.

I claim as new and desire to secure by Letters Patent of the United States:

1. In a device of the class described, a vehicle having steering mechanism, a signal therefor, a source of current supply for said signal, a switch for establishing a circuit through said source of current supply and said signal, circuit holding means energized from said circuit to maintain the circuit, a movable member connected with said source of current supply, means actuated by the closing of said switch to cause operative connection of said movable member with said steering mechanism for movement in a direction thereby as signaled for and then movement in an opposite direction thereby, a contact with which said movable member engages when moved in said opposite direction, said contact being connected with said circuit holding means to shunt it on such engagement occurring, a guard brought into operative position by said circuit holding means when it is energized to prevent engagement of said movable member with said contact when the movable member is first moved in such opposite direction before being moved in said first mentioned direction and then in said opposite direction.

2. In combination with a vehicle having steering mechanism, a signal comprising signal mechanism, a source of current supply for said signal mechanism, a switch for establishing a circuit through said source of current supply and said signal mechanism, means energized from said circuit to maintain the signal mechanism energized, a movable member connected with said source of current supply, means actuated by the closing of said switch to cause operative connection of said movable member with said steering mechanism for movement in one direction thereby and then movement in an opposite direction thereby, contacts closed by said movable member when it moves in said opposite direction, said contacts being connected with said first means to shunt it on such engagement occurring, a guard to prevent engagement of said contacts when said movable member is first moved in such opposite direction before being moved in said one direction and then in said opposite direction, and means operated by said movable member to render said guard ineffective when said movable member is moved in said one direction.

3. In a device of the class described, a source of current supply, a vehicle having steering mechanism, a signal therefor, a normally open switch, current conductors connecting said current supply, signal and switch, said switch establishing a circuit through said source of current supply and said signal upon closure of the switch, a movable member connected with said source of current supply, electroresponsive means for maintaining said circuit closed and for moving said movable member to cause it to operatively engage said steering mechanism and thereby respond to movement thereof, said electroresponsive means being responsive to energization of said circuit, a resistance series connected with said electroresponsive means after said switch is opened, a contact engageable with said movable member only after said steering mechanism moves in a predetermined direction and when it then moves in a return direction, said contact being connected with said source of current supply to shunt it around the electroresponsive means and thereby reduce energization thereof through said resistance to an extent permitting said circuit to open when the movable member engages said contact, and guard means for said contact to prevent engagement of said movable means therewith and to prevent shunting of said electro-responsive means through said resistance if the movable means moves first in said return direction before moving in said predetermined direction.

4. In a device of the class described, a source of current supply, a vehicle having steering mechanism, a signal therefor, a normally open switch, current conductors connecting said current supply, signal and switch, said switch establishing a circuit through said source of current supply and said signal upon closure thereof, a movable member connected with said source of current supply, electroresponsive means for moving said movable member to cause it to operatively engage said steering mechanism and thereby respond to movement thereof, said electroresponsive means being responsive to energization of said circuit, a holding switch closed by energization of said electroresponsive means, a resistance connected in series with said electroresponsive means by said holding switch, and contacts engaged by movement of said movable member only after said steering mechanism moves in a predetermined direction and when it then moves in a return direction, said contacts being connected with said source of current supply to shunt it around said electroresponsive means and to reduce energization thereof through said resistance to an extent permitting said circuit to open when the movable member engages said contacts guard means for said contact to prevent engagement of said movable member therewith if the movable member moves in said return direction before moving in said predetermined direction.

5. In a signal device, a source of current supply, a vehicle having steering mechanism, a signal therefor, a normally open switch, current conductors connecting said current supply, signal and switch, said switch establishing a circuit through said source of current supply and said signal upon closure thereof, a movable member connected with said source of current supply, electroresponsive means for maintaining said circuit closed and for moving said movable member to cause it to operatively engage said steering mechanism and thereby respond to movement thereof, said electroresponsive means being responsive to energization of said circuit, a contact engageable with said movable member after said steering mechanism moves in a predetermined direction and when it then moves in a return direction, said contact being connected with said source of current supply to shunt it around said electroresponsive means and thereby effect de-energization thereof, guard means for said contact to prevent engagement of said movable means therewith if the movable means moves in said return direction before moving in said predetermined direction, and cam means operable by said movable member when it moves in said predetermined direction to render said guard means ineffective.

6. In a device of the class described, a vehicle having steering mechanism, a signal therefor, a source of current supply for said signal, a switch, conductors connecting said signal, source of current supply and switch, said switch, upon closure thereof, establishing a circuit through said source of current supply and said signal, means energized from said circuit to maintain said circuit closed, a movable member connected with said source of current supply, said means being operatively connected therewith to move said movable member into frictional connection with said steering mechanism when said means is energized, a contact with which said movable member engages when moved in one direction, said contact being connected with said means to deenergize it upon said engagement occurring, and an electrical guard for said contact moved into guarding position by energization of said means and out of guarding position by said initial movement of said movable means in said direction.

7. In a device of the class described, a vehicle having steering mechanism, a signal therefor, a source of current supply for said signal, a switch, conductors connecting said signal, source of current supply and switch, said switch, upon closure thereof, establishing a circuit through said source of current supply and said signal, means energized from said circuit to maintain said circuit closed, a movable member connected with said source of current supply, said means upon being energized by the closing of said switch causing operative connection of said movable member with said steering mechanism for movement in one direction and then in an opposite direction thereby, a contact with which said movable member engages when moved in such opposite direction, said contact being connected with said means to cause substantial weakening of the energization thereof upon such engagement occurring to thereby open said circuit and to discontinue the operative connection between the movable member and the steering mechanism, and means rendered operative by said first means and rendered inoperative by movement of said movable member in said opposite direction preceding movement in said one direction to guard said contact against being engaged by said movable member.

8. In a device of the class described, a vehicle having steering mechanism, a signal therefor, a source of current supply therefor, a switch, conductors connecting said signal, source of current supply and switch, said switch, upon closure thereof, establishing a circuit through said source of current supply and said signal, means energized from said circuit to maintain said circuit closed, a movable member connected with said source of current supply, an arm pivoted thereto, a shoe carried by said arm, said means when actuated by the closing of said switch causing movement of said movable member and thereby operative engagement of said shoe with said steering mechanism for movement in one direction thereby and then movement in an opposite direction thereby, a contact with which said shoe engages when moved in such opposite direction, said contact being connected with said first means to shunt it upon such engagement occurring, and electrical guard means for said contact rendered operable by said first means and inoperative by said shoe when it moves in said opposite direction preceding movement in said one direction.

9. In a device of the class described, a vehicle having steering mechanism, a signal therefor, a source of current supply for said signal, a switch, electrical connections for said signal, source of current supply and switch, said switch, upon closure thereof, establishing a circuit through said source of current supply and said signal, means energized from said circuit to maintain said circuit closed, a movable member connected with said source of current supply, an arm pivoted thereto, a shoe carried by said arm, said means causing movement of said movable member and thereby operative engagement of said shoe with said steering mechanism for movement in one direction and then in an opposite direction thereby, a contact with which said shoe engages when moved in such opposite direction, a resistance connected in series with said means by energization of the means, said contact being connected with said means and said resistance to cause substantial weakening of the energization of the means through said resistance upon such engagement occurring to thereby open said circuit and discontinue the operative connection between said shoe and the steering mechanism, guard means for said contact, and an operative connection between said shoe and said guard means to render the guard means inoperative by initial movement of said shoe in said opposite direction to prevent such weakening of the energization of said means through said resistance.

10. A device of the class described, including a vehicle having steering mechanism, a signal therefor, a source of current supply for said signal, a switch, said switch, upon closure thereof, establishing a circuit through said source of current supply and said signal, means energized from said circuit to maintain said circuit closed, a movable member connected with said source of current supply, an arm pivoted thereto, a shoe carried by said arm, said means being effective to cause movement of said movable member and thereby frictional engagement of said shoe with said steering mechanism for movement in one direction and then in an opposite direction thereby, a contact with which said shoe engages when moved in such opposite direction, said contact being connected with said first means to cause substantial weakening of the energization thereof upon such engagement occurring to thereby open said circuit and to discontinue the frictional connection between said shoe and the steering mechanism, a guard interposed between said contact and said shoe, and a camming connection between said guard and said shoe to remove the guard from its interposed position upon movement of said shoe in said one direction.

EDMUND A. REED.